United States Patent
Kato et al.

(10) Patent No.: US 7,285,343 B2
(45) Date of Patent: Oct. 23, 2007

(54) BONDED MEMBRANE-ELECTRODE ASSEMBLY HAVING WATER-ELECTROLYZING AND POWER-GENERATING FUNCTIONS, AND FUEL CELL SYSTEM PROVIDED WITH WATER ELECTROLYZER USING THE SAME

(75) Inventors: Eiji Kato, Inuyama (JP); Katsumi Kanematsu, Inuyama (JP); Shoji Nawa, Inuyama (JP); Yasuo Ido, Inuyama (JP)

(73) Assignee: Daido Metal Company Ltd., Nagoya (JP)

( * ) Notice: Subject to any disclaimer, the term of this patent is extended or adjusted under 35 U.S.C. 154(b) by 511 days.

(21) Appl. No.: 10/870,465

(22) Filed: Jun. 18, 2004

(65) Prior Publication Data

US 2004/0258967 A1 Dec. 23, 2004

(30) Foreign Application Priority Data

Jun. 20, 2003 (JP) .............................. 2003-176789

(51) Int. Cl.
*H01M 8/06* (2006.01)

(52) U.S. Cl. .............................. 429/17; 429/31; 429/41
(58) Field of Classification Search .................. 429/17, 429/31, 41
See application file for complete search history.

(56) References Cited

U.S. PATENT DOCUMENTS

| 5,372,617 | A | * | 12/1994 | Kerrebrock et al. ........... 48/61 |
| 5,514,486 | A | * | 5/1996 | Wilson ......................... 429/30 |
| 2004/0238353 | A1 | * | 12/2004 | Kato et al. .................. 204/263 |

FOREIGN PATENT DOCUMENTS

| JP | 11269688 | 10/1999 |
| JP | 2000064080 | 2/2000 |

\* cited by examiner

*Primary Examiner*—Mark Ruthkosky
(74) *Attorney, Agent, or Firm*—Browdy and Neimark, PLLC

(57) ABSTRACT

A bonded membrane-electrode assembly is provided which enables the electrolysis of water, which has water-electrolyzing and power-generating functions enabling the generation of hydrogen, and which is capable of being utilized for a fuel cell; and a fuel cell system with a water electrolyzer is provided using a plurality of such bonded membrane-electrode assemblies. The bonded membrane-electrode assembly includes a solid polymer electrolyte membrane, an oxygen electrode bonded to one of sides of the solid polymer electrolyte membrane, and a hydrogen electrode bonded to the other side of the solid polymer electrolyte membrane. The oxygen electrode includes a porous sheet-shaped carbon element plated with iridium, a first coated layer formed on a surface of the sheet-shaped carbon element, which is in contact with the solid polymer electrolyte membrane, by applying a mixture containing carbon and a resin for the solid polymer electrolyte membrane on that surface, and a second coated layer formed on the first coated layer by applying a mixture containing Pt (alloy) and/or Pt (alloy)-carried carbon and a resin for the solid polymer electrolyte membrane thereon. The hydrogen electrode includes a porous sheet-shaped carbon element, a first coated layer formed on the sheet-shaped carbon element by applying a mixture containing carbon and a resin for the solid polymer electrolyte membrane on the surface thereof, and a second coated layer formed on the first coated layer by applying a mixture containing Pt (alloy) and/or Pt (alloy)-carried carbon and a resin for the solid polymer electrolyte membrane thereon.

3 Claims, 2 Drawing Sheets

BONDED MEMBRANE-ELECTRODE ASSEMBLY HAVING WATER-ELECTROLYZING AND POWER-GENERATING FUNCTIONS, AND FUEL CELL SYSTEM PROVIDED WITH WATER ELECTROLYZER USING THE SAME

BACKGROUND OF THE INVENTION

1. Field of the Invention

The present invention relates to a bonded membrane-electrode assembly having water-electrolyzing and power-generating functions, and particularly, to a bonded membrane-electrode assembly including a solid polymer electrolyte membrane, and an oxygen electrode and a hydrogen electrode which are bonded to opposite sides of the membrane, and to a fuel cell system provided with a water electrolyzer, which can be used as a fuel cell including a hydrogen-generating device utilizing the bonded membrane-electrode assembly.

2. Description of the Related Art

At present, a fuel cell attracts a great deal of attention as a generator tender to an environment and having a high efficiency, and has been developed so that it can be put to practical use. In the fuel cell, hydrogen, LPG (liquefied natural gas), alcohol or the like is used as a fuel, but particularly, if an environment is taken into consideration, hydrogen is most preferable, and hydrogen supplied from a bomb containing hydrogen sealedly incorporated therein or a bomb containing a hydrogen-absorption alloy incorporated therein is utilized.

To obtain hydrogen for this purpose, the electrolysis of water is carried out, and an apparatus for generating hydrogen by the electrolysis of water includes, particularly, a hydrogen-generating apparatus using an ion exchange membrane with brine such as sea water used as a supply water (for example, see JP-A-2000-64080).

An insoluble electrode used for the electrolysis of brine includes an electrode whose base material can be inhibited from being damaged under a high current density condition and under a high voltage condition, but also includes a platinum-iridium based electrode which has a high hydrogen-generating efficiency and whose long life can be achieved (for example, see JP-A-11-269688).

In such a water electrolyzer for carrying out a process for producing hydrogen, in general, hydrogen is generated by supplying an electric current in a state in which water is acidic or alkaline. In this case, an acid or base used is strongly acidic or strongly alkaline, resulting in a problem in safety.

SUMMARY OF THE INVENTION

The present invention has been accomplished with the above-described problem in view, and it is an object of the present invention to provide a bonded membrane-electrode assembly having water-electrolyzing and power-generating functions, wherein hydrogen capable of being used as a fuel for a fuel cell can be generated by electrolyzing water safely.

It is another object of the present invention to provide a fuel cell system provided with a water electrolyzer, which is safe for use and which is constructed using a bonded membrane-electrode assembly having water-electrolyzing and power-generating functions, so that hydrogen can be produced and a power can be generated using such hydrogen.

To achieve one of the above objects, according to the present invention, there is provided a bonded membrane-electrode assembly having water-electrolyzing and power-generating functions, comprising a solid polymer electrolyte membrane, an oxygen electrode bonded to one of sides of the solid polymer electrolyte membrane, and a hydrogen electrode bonded to the other side of the solid polymer electrolyte membrane, the oxygen electrode including a porous sheet-shaped carbon element plated with iridium, a first coated layer formed on a surface of the sheet-shaped carbon element, which is in contact with the solid polymer electrolyte membrane, by applying a mixture containing carbon and a resin for the solid polymer electrolyte membrane, and a second coated layer formed on the first coated layer adjacent the solid polymer electrolyte membrane by applying a mixture containing Pt (alloy) and/or Pt (alloy)-carried carbon and a resin for the solid polymer electrolyte membrane, and the hydrogen electrode including a porous sheet-shaped carbon element, a first coated layer formed on a surface of the sheet-shaped carbon element, which is in contact with the solid polymer electrolyte membrane, by applying a mixture containing carbon and a resin for the solid polymer electrolyte membrane, and a second coated layer formed on the first coated layer adjacent the solid polymer electrolyte membrane by applying a mixture containing Pt (alloy) and/or Pt (alloy)-carried carbon and a resin for the solid polymer electrolyte membrane.

To achieve the other object, according to the present invention, there is provided a fuel cell system provided with a water electrolyzer, comprising bonded membrane-electrode assembly system which comprises at least a pair of bonded membrane-electrode assemblies having water-electrolyzing and power-generating functions and each comprising a solid polymer electrolyte membrane, an oxygen electrode bonded to one of sides of the solid polymer electrolyte membrane, and a hydrogen electrode bonded to the other side of the solid polymer electrolyte membrane; an end plate interposed between the pair of bonded membrane-electrode assemblies; opposite outer end plates between which at least the pair of bonded membrane-electrode assemblies are positioned; a hydrogen flow passage formed through central portions of the bonded membrane-electrode assemblies to permit the flowing of a fluid therethrough; a single tie bolt passed through the hydrogen flow passage in the central portions of the bonded membrane-electrode assemblies to integrate these members, and a fixing nut threadedly fitted over the tie bolt to integrally tighten the bonded membrane-electrode assemblies between the end plates through O-rings or the like threadedly fitted over opposite ends of the tie bolt; each of the bonded membrane-electrode assemblies including a flow passage plate adjacent the oxygen electrode, and a separator plate serving as a collector plate and mounted adjacently outside the flow passage plate and outside the hydrogen electrode; one of the bonded membrane-electrode assemblies being immersed in water, and a DC power source being connected to the separator plate of the one bonded membrane-electrode assembly.

In such fuel cell system provided with the water electrolyzer, one of the bonded membrane-electrode assemblies having the water-electrolyzing function is constructed in such a manner that the oxygen electrode includes a porous sheet-shaped carbon element plated with iridium, and a coated layer formed on a surface of the sheet-shaped carbon element, which is in contact with the solid polymer electrolyte membrane, by applying a mixture containing carbon and a resin for the solid polymer electrolyte membrane, and the hydrogen electrode includes a porous sheet-shaped carbon element, a first coated layer formed on a surface of the sheet-shaped carbon element, which is in contact with the solid polymer electrolyte membrane, by applying a mixture containing carbon and a resin for the solid polymer electrolyte membrane, and a second coated layer formed on the first coated layer adjacent the solid polymer electrolyte membrane by applying a mixture containing Pt (alloy) and/or Pt (alloy)-carried carbon and a resin for the solid polymer electrolyte membrane; and the other of the bonded membrane-electrode assemblies having the power-generating function is constructed in such a manner that each of the oxygen electrode and the hydrogen electrode includes a porous sheet-shaped carbon element, a first coated layer formed on a surface of the sheet-shaped carbon element, which is in contact with the solid polymer electrolyte membrane, by applying a mixture containing carbon and a resin for the solid polymer electrolyte membrane, and a second coated layer formed on the first coated layer adjacent the solid polymer electrolyte membrane by applying a mixture containing Pt (alloy) and/or Pt (alloy)-carried carbon and a resin for the solid polymer electrolyte membrane.

In the fuel cell system provided with the water electrolyzer, at least one of the bonded membrane-electrode assemblies is constructed in such a manner that the oxygen electrode includes a porous sheet-shaped carbon element plated with iridium, a first coated layer formed on a surface of the sheet-shaped carbon element, which is in contact with the solid polymer electrolyte membrane, by applying a mixture containing carbon and a resin for the solid polymer electrolyte membrane, and a second coated layer formed on the first coated layer adjacent the solid polymer electrolyte membrane by applying a mixture containing Pt (alloy) and/or Pt (alloy)-carried carbon and a resin for the solid polymer electrolyte membrane, and the hydrogen electrode includes a porous sheet-shaped carbon element, a first coated layer formed on a surface of the sheet-shaped carbon element, which is in contact with the solid polymer electrolyte membrane, by applying a mixture containing carbon and a resin for the solid polymer electrolyte membrane, and a second coated layer formed on the first coated layer adjacent the solid polymer electrolyte membrane by applying a mixture containing Pt (alloy) and/or Pt (alloy)-carried carbon and a resin for the solid polymer electrolyte membrane.

In each of the bonded membrane-electrode assemblies having the water-electrolyzing and power-generating functions according to the present invention, the oxygen electrode is produced by plating the porous sheet-shaped carbon element with iridium, applying the mixture containing the carbon and the resin for the solid polymer electrolyte membrane onto the surface of the porous sheet-shaped carbon element to form the first coated layer, and applying the mixture containing Pt (alloy) and/or Pt (alloy)-carried carbon and the resin for the solid polymer electrolyte membrane onto the surface of the first coated layer to form the second coated layer, and the hydrogen electrode is produced by applying the mixture containing the carbon and the resin for the solid polymer electrolyte membrane onto the surface of the porous sheet-shaped carbon element to form the first coated layer, and applying the mixture containing Pt (alloy) and/or Pt (alloy)-carried carbon and the resin for the solid polymer electrolyte membrane onto the surface of the first coated layer to form the second coated layer. The solid polymer electrolyte membrane is interposed between the respective second coated layers of the oxygen electrode and the hydrogen electrode produced in this manner, and these members are integrated together by a press, thereby producing each of the bonded membrane-electrode assemblies.

The bonded membrane-electrode assemblies produced in the above-described manner and having the water-electrolyzing and power-generating functions are immersed in water in an integrated state in which a separator plate serving as a collector plate has been disposed on the oxygen electrode with the oxygen flow passage plate interposed therebetween and a separator plate serving as a collector plate has been likewise disposed directly on the hydrogen electrode, in either case, outside the oxygen electrode and the hydrogen electrode with the solid polymer electrolyte membrane interposed therebetween. Thus, if electric current is allowed to flow through the separator plates, only positive ions which are hydrogen ions can be transmitted through the solid polymer electrolyte membrane, because such membrane is an ion exchange membrane, whereby oxygen and hydrogen can be generated in the respective electrodes.

In this case, because the porous carbon element is plated with iridium, only iridium can act in the oxygen electrode of the bonded membrane-electrode assembly by application of a voltage of 1.6 V to perform the electrolysis, thereby generating oxygen.

In the coated layer formed on the bonded membrane-electrode assembly from the mixture containing Pt (alloy) and/or Pt (alloy)-carried carbon and the resin for the solid polymer electrolyte membrane, Pt (alloy) acts as the catalyst and hence, if hydrogen is supplied to the hydrogen electrode and oxygen is supplied in the form of air from the oxygen flow passage plate, the bonded membrane-electrode assemblies function as a usual fuel cell, whereby electric current can be picked up from the separator plates.

A mixture containing PTFE in addition to the carbon and the resin for the solid polymer electrolyte membrane may be applied to form a coated layer in order to enhance the adhesion to the porous sheet-shaped carbon element.

Pt and the Pt alloy are used for the oxygen electrode, but the carbon for the electrode is used at the voltage of 1.6 V at which the carbon is not damaged; and the carbon is plated with iridium in order to enable the electrolysis of water at such voltage. Thus, the bonded membrane-electrode assembly, whose carbon element cannot be damaged and which is excellent in durability, is provided. When the bonded membrane-electrode assembly system is used in the fuel cell, iridium does not function as the catalyst in the fuel cell, and Pt in the Pt (alloy) and/or Pt (alloy)-carried carbon element functions the catalyst for producing water by bonding of hydrogen ions, electrons and oxygen. Therefore, the bonded membrane-electrode assemblies as the system are excellent in durability.

Further, a fuel cell system is provided, which is constructed in the following manner using the bonded membrane-electrode assembly having the water-electrolyzing and power-generating functions according to the present invention is used for the following construction: a separator plate is interposed therebetween the pair of bonded membrane-electrode assemblies, and the bonded membrane-electrode assemblies are positioned between end plates mounted outside the opposite sides thereof. A hydrogen flow passage for permitting the flowing of a fluid therethrough is provided to extend through central portions of the pair of bonded membrane-electrode assemblies, and a hydrogen flow passage is also provided in central portions of an oxygen flow passage plate, the separator plates and the end plates to align with and communicate with the hydrogen flow passage provided through the central portions of the pair of bonded membrane-electrode assemblies. In order to integrate these members, the bonded membrane-electrode assemblies are integrally clamped between the end plates by a fixing nut through a single tie bolt passed through the hydrogen flow passage in the central portions of the bonded membrane-electrode assemblies and O-rings or the like threadedly fitted over opposite ends of the tie bolt. In this manner, a fuel cell system is provided. In this case, the bonded membrane-electrode assemblies are not limited to the use as the pair, and a plurality of the bonded membrane-electrode assemblies may be stacked one on another, whereby oxygen and hydrogen can be generated as required. The generated hydrogen can be supplied to the membrane-electrode assemblies functioning as the fuel cell to provide a power-generation action effect.

Additionally, a fuel cell system provided with a water electrolyzer using inexpensive bonded membrane-electrode assemblies is provided. This fuel cell system is constructed using one of the pair of bonded membrane-electrode assemblies having the water-electrolyzing function in the same arrangement as that described above and using the other bonded membrane-electrode assembly having the power-generating function in an arrangement in which each of the oxygen electrode and the hydrogen electrode is formed using a sheet-shaped carbon element which is not plated with iridium. This fuel cell system can be operated as one similar to the conventional fuel cell.

The above and other objects, features and advantages of the invention will become apparent from the following description of the preferred embodiment taken in conjunction with the accompanying drawings.

DESCRIPTION OF THE PREFERRED EMBODIMENTS

A bonded membrane-electrode assembly system having water-electrolyzing and power-generating functions and a fuel cell provided with a water electrolyzer using the bonded membrane-electrode assembly according to the present invention will now be described with reference to the accompanying drawings.

Figure 1:
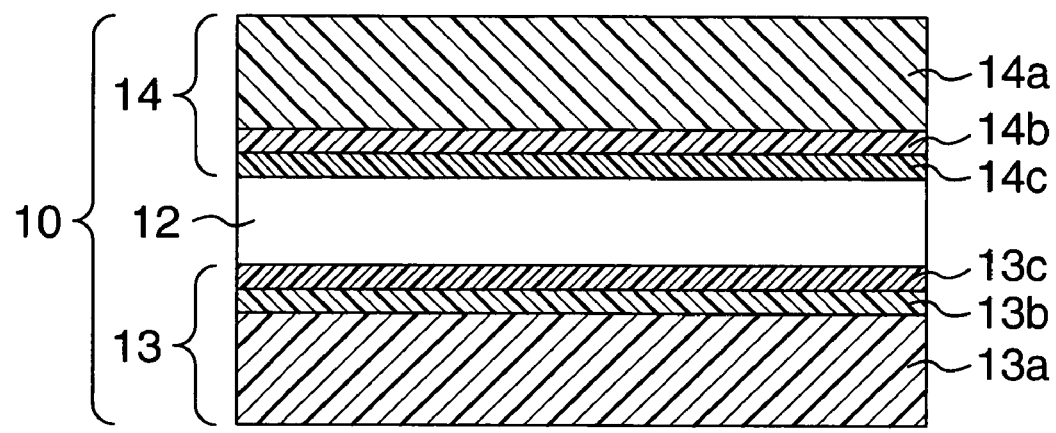
FIG. 1 is a schematic diagram showing a bonded membrane-electrode assembly having water-electrolyzing and power-generating functions according to an embodiment of the present invention.
Figure 3:
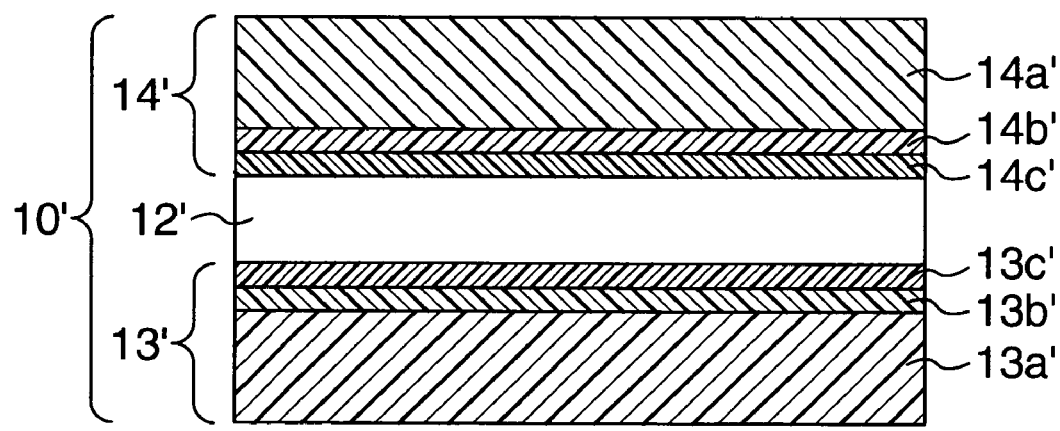
FIG. 3 is a schematic diagram of a bonded membrane-electrode assembly which can be used in a commonly used fuel cell, which corresponds to the bonded membrane-electrode assembly according to the embodiment of the present invention.
Figure 2:
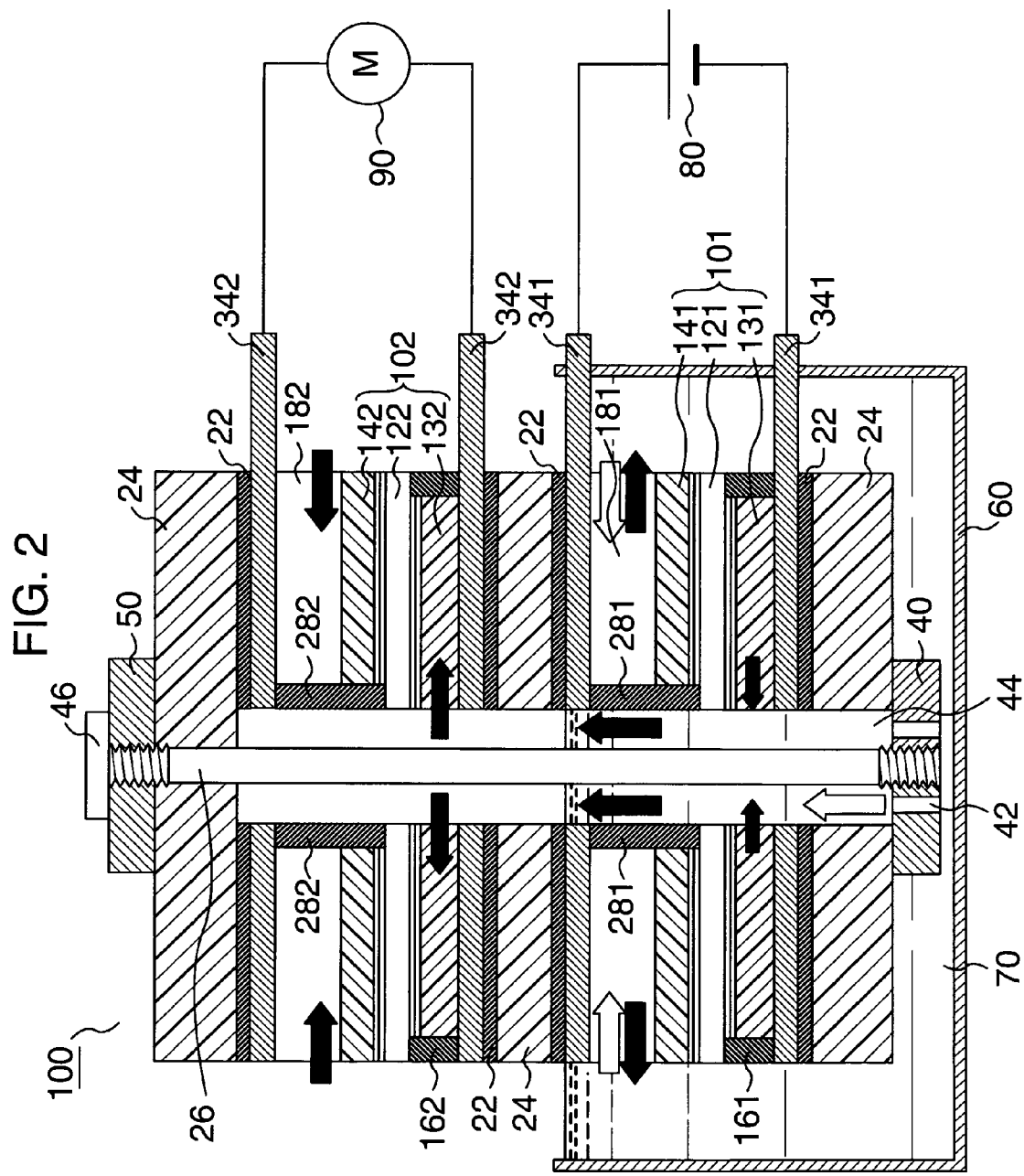
FIG. 2 is a schematic view of a fuel cell system provided with a water electrolyzer using the bonded membrane-electrode assemblies.

FIG. 1 is a schematic diagram of a bonded membrane-electrode assembly having water-electrolyzing and power-generating functions according to the embodiment of the present invention, FIG. 2 is a schematic view of a fuel cell system provided with a water electrolyzer using this bonded membrane-electrode assemblies, and FIG. 3 is a schematic diagram of a bonded membrane-electrode assembly which can be used in a commonly used fuel cell.

First, a bonded membrane-electrode assembly 10' of a commonly used fuel cell will be described with reference to FIG. 3 so as to be compared with a bonded membrane-electrode assembly 10 having water-electrolyzing and power-generating functions according to the present invention. A solid polymer electrolyte membrane 12' made of a perfluorocarbon sulfonic acid polymer material and a hydrogen electrode 13' and an oxygen electrode 14' disposed on opposite sides of the solid polymer electrolyte membrane 12' are bonded to one another. The hydrogen electrode 13' includes a porous sheet-shaped carbon element 13a', a coated layer 13b' formed on a surface of the carbon element 13a' by applying a mixture containing carbon and a resin for the solid polymer electrolyte membrane on that surface, and a coated layer 13c' formed on the coated layer 13b' by applying a mixture containing pt (alloy) and/or Pt (alloy)-carried carbon and a resin for the solid polymer electrolyte membrane thereon.

The oxygen electrode 14' on a side of the solid polymer electrolyte membrane 12' opposite to the hydrogen electrode 13' includes a porous sheet-shaped carbon element 14a', a coated layer 14b' formed on a surface of the porous sheet-shaped carbon element 14a' by applying a mixture containing carbon and a resin for the solid polymer electrolyte membrane on that surface, and a coated layer 14c' formed on the coated layer 14b' by applying a mixture containing Pt (alloy) and/or Pt (alloy)-carried carbon and a resin for the solid polymer electrolyte membrane thereon.

The assembly produced by placing the solid polymer electrolyte membrane 12' between the hydrogen electrode 13' and the oxygen electrode 14' and integrating them by a press is used in a fuel cell using hydrogen as a fuel. If a separator plate made of a stainless steel is mounted to the assembly and disposed outside the hydrogen electrode 13' and the oxygen electrode 14, only hydrogen ions can be transmitted through the solid polymer electrolyte membrane 12' by the action of a catalyst and the solid polymer electrolyte membrane 12' between oxygen supplied to the oxygen electrode 14' and hydrogen supplied to the hydrogen electrode 13', whereby electric current can be picked up from the separator plate which serves as a collector plate.

The bonded membrane-electrode assembly 10' comprises the electrodes, the catalyst and the ion exchange membrane which are integrated together. Pt and/or a Pt alloy and/or Pt- and/or Pt alloy-carried carbon are used as the catalyst, and the solid polymer electrolyte membrane 12' is used as the ion exchange membrane, through which positive ions are transmitted.

The bonded membrane-electrode assembly 10 according to the present invention has not only the power-generating function similar to that of the bonded membrane-electrode assembly 10', but also the water-electrolyzing function, so that oxygen and hydrogen can be generated. This assembly 10 has an arrangement described below. As shown in FIG. 1, the bonded membrane-electrode assembly 10 having the water-electrolyzing function and the power-generating function includes a hydrogen electrode 13 and an oxygen electrode 14 which are disposed so that a solid polymer electrolyte membrane 12 made of a perfluorocarbon sulfonic acid polymer material as in the fuel cell is interposed between the electrodes 13 and 14.

The hydrogen electrode 13 includes a porous sheet-shaped carbon element 13a applied a PTFE treatment for providing a water-repellant property, a first coated layer 13b formed on a surface of the carbon element 13a by applying a mixture containing carbon, PTFE and a resin for the solid polymer electrolyte membrane on that surface, and a second coated layer 13c formed on the coated layer 13b by applying a mixture containing Pt (alloy) and/or Pt (alloy)-carried carbon and a resin for the solid polymer electrolyte membrane thereon.

The oxygen electrode 14 includes a porous sheet-shaped carbon element 14a plated with iridium, a first coated layer 14b formed on a surface of the carbon element 14a by applying a mixture containing carbon, PTFE and a resin for the solid polymer electrolyte membrane on that surface. Further, as in the hydrogen electrode 13, a second coated layer 14c is formed on the first coated layer 14b by applying a mixture containing Pt (alloy) and/or Pt (alloy)-carried carbon and a resin for the solid polymer electrolyte membrane thereon.

The solid polymer electrolyte membrane 12 is interposed between the hydrogen electrode 13 and the oxygen electrode 14 each of which is of the above-described arrangement, and all of them are integrated together by a press, thereby forming the bonded membrane-electrode assembly 10.

The bonded membrane-electrode assembly 10 arranged in the above-described manner is used as a bonded membrane-electrode assembly 101 for generating hydrogen and as a bonded membrane-electrode assembly 102 for a fuel cell, so that hydrogen can be generated by the electrolysis of water, and an electric power can be generated by the generated hydrogen. Thus, a fuel cell 100 provided with a water electrolyzer as shown in FIG. 2 can be constructed. The fuel cell 100 provided with the water electrolyzer according to the present invention will be described below with reference to FIG. 2.

In the fuel cell 100 provided with the water electrolyzer, an opening is provided in central portions of the bonded membrane-electrode assemblies 101 and 102. As in the fuel cell, an outer seal 161 is mounted in the hydrogen-generating bonded membrane-electrode assembly 101 on the side of a hydrogen electrode 131 for directing hydrogen generated in a region of the hydrogen electrode 131 to a hydrogen flow passage 44 (which will be described hereinafter) in the central portion, and a separator plate 341 functioning as a collector plate made of a stainless steel is mounted in close contact on an outer side of the seal 161. Further, an end plate 24 made of an epoxy resin is disposed on an outer side of the separator plate 341 with an end gasket 22 of a synthetic rubber such as EPDM interposed therebetween. An oxygen flow passage plate 181 made of a carbon material is mounted adjacent on the side of an oxygen electrode 141, and a separator plate 341 functioning as a collector plate is mounted axially outside the oxygen flow passage plate 181. Further, an end plate 24 is mounted axially outside the separator plate 341 with an end gasket 22 of a synthetic rubber such as EPDM interposed therebetween. A hydrogen flow passage 44 is provided in both of the separator plates 341, 341, both of the end gaskets 22, 22 and both of the end plates 24, 24 in correspondence to the opening in the central portion of the bonded membrane-electrode assembly 101, so that a through-channel is formed in the central portion. The hydrogen-generating bonded membrane-electrode assembly 101 arranged in the above-described manner is immersed in water in a water tank 60, and ends of the separator plates 341, 341 are connected to a power source 80. In this case, in order to inhibit the flowing of the oxygen into the hydrogen flow passage 44, an inner seal 281 having a inside diameter corresponding to that of the hydrogen flow passage 44 is mounted to inner peripheries of the oxygen electrode 141 and the oxygen flow passage plate 181, which face to the opening in the central portion.

The power-generating bonded membrane-electrode assembly 102 is mounted so that it is stacked to the end plate 24 of the hydrogen-generating bonded membrane-electrode assembly 101 located outside the water tank 60 with the end gasket 22 interposed therebetween. The power-generating bonded membrane-electrode assembly 102 has the same arrangement as the hydrogen-generating bonded membrane-electrode assembly 101. In this arrangement, an opening is provided in a central portion of the bonded membrane-electrode assembly 102, and the hydrogen electrode 132, into which hydrogen in the hydrogen flow passage 44 is introduced, is provided with an outer seal 162 for receiving hydrogen generated in the hydrogen-generating bonded membrane-electrode assembly 101 from the hydrogen flow passage 44 in the central portion. Further, a separator plate 342 functioning as a collector plate made of a stainless steel is mounted in close contact on an outer side of the hydrogen electrode 132, so that it is superposed thereon. An oxygen flow passage plate 182 made of a carbon material and functioning as a collector plate is mounted adjacently to the oxygen electrode 142, and a separator plate 342 functioning as collector plate is mounted adjacently axially outside the oxygen flow passage plate 182. An end plate 24 is mounted axially outside the separator plate 342 with an end gasket 22 of a synthetic rubber such as EPDM interposed therebetween. A hydrogen flow passage 44 is provided in both of the separator plates 342, 342, both of the end gaskets 22, 22 and both of the end plates 24, 24 in correspondence to the opening in the central portion of the bonded membrane-electrode assembly 102, so that a through-channel is formed in the central portion. An inner seal 282 is mounted to inner sides of the oxygen electrode 142 and the oxygen flow passage plate 182 facing to the hydrogen flow passage 44 to inhibit the communication with the hydrogen flow passage 44. The bonded membrane-electrode assembly 102 for the fuel cell arranged in the above-described manner is placed in a state in which it is exposed to the outside from the water tank 60, so that it is located in the atmosphere without being immersed in the water 70 in the water tank 60.

The hydrogen-generating bonded membrane-electrode assembly 101 and the power-generating bonded membrane-electrode assembly 102 stacked one on another as described above are constructed in an integral structure by passing a tie bolt 26 threaded at opposite ends through the center of the hydrogen flow passage 44 extending through the central portion and by tightening a pair of nuts 40 and 50 threadedly onto axially outer surfaces of the end plates 24, respectively.

The integral structure portion of the bonded membrane-electrode assembly 10 arranged in the above-described manner is located so that it is immersed in the water 70 in the water tank 60 at least as far as the separator plate 341 outside the oxygen electrode 141, thereby constructing the fuel cell 100 provided with the water electrolyzer.

In the water-electrolyzing bonded membrane-electrode assembly 101 in the fuel cell 100 of the above-described arrangement provided with the water electrolyzer, if the oxygen-generating oxygen electrode 141 is coated with Pt, it is necessary to set the voltage at a value equal to or higher than 2 V for the purpose of the electrolysis of water. However, the sheet-shaped carbon element 14a of the oxygen electrode 141 may be damaged at such a voltage, resulting in a problem in durability of the oxygen electrode 141. For this reason, the porous sheet-shaped carbon element 14a of the oxygen electrode 141 is plated with iridium, whereby the electrolysis of water is possible, and the damage to the carbon element can be avoided, leading to an excellent durability of the oxygen electrode 141.

The relationship among the voltage for the electrolysis, the generation of oxygen gas and the damage to the carbon element in cases of the catalyst Pt and iridium on the side of the oxygen electrode 141 is as follows:

TABLE 1

| Voltage (V) | 1.2 | 1.4 | 1.6 | 1.8 | 2.0 | 2.2 |
|---|---|---|---|---|---|---|
| Pt | | | | | | |
| Generation of oxygen gas | N | N | N | N | G | N |
| Damage to electrode | ○ | ○ | ○ | ○ | Δ | X |
| Iridium | | | | | | |
| Generation of oxygen gas | N | N | G | G | G | G |
| Damage to electrode | ○ | ○ | ○ | ○ | ○ | ○ |

Note:
N: not generated; G: generated; ○: not damaged; Δ: partially damaged; and X: damaged In the bonded membrane-electrode assembly 101 in the fuel cell 100 provided with the water electrolyzer as mentioned above, the bonded membrane-electrode assembly 101, the oxygen flow passage plate 181 and the separator plate 341 are immersed in the water 70. Therefore, when electric current is supplied from the power source 80 to both of the separator plates 341, 341, only hydrogen ions which are positive ions are transmitted from the side of the oxygen electrode 141 through the solid polymer electrolyte membrane 121 to reach Pt (alloy) coated on the hydrogen electrode 131, where it is reacted to generate hydrogen. The generated hydrogen is passed through the porous sheet-shaped carbon element 13a and fed into the hydrogen flow passage 44 in the power-generating bonded membrane-electrode assembly 102 located outside the water tank 60, because the outer periphery of the hydrogen electrode 131 is covered with the outer seal 161 made of the synthetic rubber such as EPDM. Then, the hydrogen is supplied to the hydrogen electrode 132 of the power-generating bonded membrane-electrode assembly 102 as shown by black arrows, because the end of the hydrogen flow passage 44 on the side of the nut 50 is closed.

On the other hand, on the side of the oxygen electrode 141, oxygen is generated by the catalytic action of coated iridium, as in the hydrogen electrode 131, because the oxygen electrode 141 and the oxygen flow passage plate 181 are immersed in the water supplied from the water tank 60 as shown by a white arrow and the separator plate 341 is supplied with electric current. The generated oxygen can be fed to the outer periphery of the oxygen electrode 141 and into the water 70 in the water tank 60 as shown by black arrows and released to the atmosphere, because the oxygen flow passage plate 181 is comprised of the porous carbon element and because the inner seal 281 is disposed on the inner periphery of the oxygen flow passage plate 181 facing to the hydrogen flow passage 44.

As described above, the hydrogen generated by the hydrogen electrode 131 of the water-electrolyzing bonded membrane-electrode assembly 101 of the fuel cell 100 is conducted in a direction shown by a black arrow from the hydrogen flow passage 44 in the center portion to reach the hydrogen electrode 132 of the power-generating bonded membrane-electrode assembly 102. The hydrogen conducted to the hydrogen electrode 132 and the oxygen supplied to the oxygen electrode 142 as air from an atmosphere to the oxygen flow passage plate 182 can achieve a power-generating function by the reaction with the solid polymer electrolyte membrane 122 between the hydrogen electrode 132 and the oxygen electrode 142. The generated electric current can be supplied through the separator plates 342, 342 each functioning as the collector plate to a power load 90 such as a motor connected to the separator plates 342, 342.

The power-generating bonded membrane-electrode assembly 102 used in the fuel cell 100 of the above-described arrangement is of the same arrangement as that of the water-electrolyzing bonded membrane-electrode assembly 101, but a power-generating bonded membrane-electrode assembly 102 which is as shown in FIG. 3 and which includes an oxygen electrode 142 having a porous sheet-shaped carbon element which is not plated with iridium, may be used.

More specifically, in the water-electrolyzing bonded membrane-electrode assembly 101, the oxygen electrode 141 includes the porous sheet-shaped carbon element 14a plated with iridium, and the coated layer 14b formed on the surface of the sheet-shaped carbon element 14a, which is in contact with the solid polymer electrolyte membrane 12, by applying the mixture containing carbon and the resin for the solid polymer electrolyte membrane on that surface. The hydrogen electrode 131 includes the porous sheet-shaped carbon element 13a, the first coated layer 13b formed on the surface of the sheet-shaped carbon element 13a, which is in contact with the solid polymer electrolyte membrane 12, by applying the mixture containing carbon and the resin for the solid polymer electrolyte membrane on that surface, and the second coated layer 13c formed on the first coated layer 13b by applying the mixture containing Pt (alloy) and/or Pt (alloy)-carried carbon and the resin for the solid polymer electrolyte membrane thereon. Thus, the bonded membrane-electrode assembly 102 having the power-generating function includes the oxygen electrode 142 and the hydrogen electrode 132, each of which includes the porous sheet-shaped carbon element, the first coated layer formed on the surface of the sheet-shaped carbon element which is in contact with the solid polymer electrolyte membrane 122 by applying the mixture containing the carbon and the resin for the solid polymer electrolyte membrane, and the second coated layer formed on the first coated layer by applying the mixture of Pt (alloy) and/or Pt (alloy)-carried carbon and the resin for the solid polymer electrolyte membrane.

Thus, iridium is not used and hence, the bonded membrane-electrode assembly, which has the power-generating function and which is inexpensive, can be employed. Therefore, the bonded membrane-electrode assembly can be used in the fuel cell provided with the water electrolyzer, leading to a reduction in cost.

In the fuel cell having the above-described arrangement, in order to withdraw air remaining in the hydrogen flow passage 44 at the start of the fuel cell, a bleeder valve 46 may be mounted on the nut 50 to lead to the hydrogen flow passage 44 and the atmosphere, so that the generated hydrogen may be supplied smoothly to the hydrogen electrode 132 of the power-generating bonded membrane-electrode assembly 102.

In addition, in order to carry out the generation of hydrogen in the hydrogen electrode 131 of the water-electrolyzing bonded membrane-electrode assembly 101, a plurality of communication bores 42 may be provided in the nut 40 to fill the hydrogen flow passage 44 with the water 70.

The fuel cell 100 provided with the water-electrolyzer according to the present invention has been described as using only the two bonded membrane-electrode assemblies 101 and 102, but depending on the required output electric current, pluralities of bonded membrane-electrode assemblies 101 and 102 may be stacked one on another, and the resulting stacks may be disposed as the hydrogen-generating bonded membrane-electrode assembly and the power-generating bonded membrane-electrode assembly, respectively, between the end plates 24, 24 in an integrated manner.

The bonded membrane-electrode assemblies having the water-electrolyzing function and the power-generating function according to the present invention provide the following advantageous effects by virtue of the above-described arrangement:

In the bonded membrane-electrode assembly having the above-described arrangement, the porous sheet-shaped carbon element plated with iridium is employed in the oxygen-generating electrode. Therefore, during electrolysis, only the iridium functions at a voltage of 1.6 V, and during generation of power, Pt on the Pt (alloy)-carried carbon element functions as the catalyst and the iridium does not function as the catalyst for generation of power. Thus, it is possible to provide for both of the electrolysis and the generation of power without damage to the carbon element, leading to an excellent effect that the bonded membrane-electrode assembly has an excellent durability.

In addition, in the fuel cell provided with the water electrolyzer and comprised of at least the pair of bonded membrane-electrode assemblies, one of units comprising the bonded membrane-electrode assemblies can be used as the hydrogen-generating bonded membrane-electrode assembly by immersing it in the water tank, whereby the electrolysis of water can be carried out by supplying electric current to the separator plate mounted on the oxygen electrode with the oxygen flow passage formed therebetween and the separator plate mounted adjacent the hydrogen electrode. Therefore, hydrogen can be generated by the electrolysis of the water, and the generated hydrogen can be supplied to the hydrogen electrode through the hydrogen flow passage in the central portion of the other power-generating bonded membrane-electrode assembly, whereby the power can be generated by cooperation with oxygen supplied through the oxygen flow passage plate. Thus, not only it is unnecessary to carry out the electrolysis of strong acidic or alkaline water to produce hydrogen, but also it is possible to supply hydrogen for the fuel cell without storing it in a bomb, leading to an effect that it is possible to provide the fuel cell provided with the safe water electrolyzer.

In the fuel cell provided with the water electrolyzer, the porous sheet-shaped carbon element which is not plated with iridium can be employed in the oxygen electrode of the power-generating bonded membrane-electrode assembly and thus, it is possible to provide fuel cell having the hydrogen-generating function and constructed using the inexpensive bonded membrane-electrode assembles.

Although the embodiments of the present invention have been described in detail, it will be understood that the present invention is not limited to the above-described embodiments, and various modifications in design may be made without departing from the spirit and scope of the invention defined in claims.

What is claimed is:

1. A fuel cell provided with a water electrolyzer, comprising a bonded membrane-electrode assembly which comprises at least a pair of bonded membrane-electrode assemblies having water-electrolyzing and power-generating functions and each comprising a solid polymer electrolyte membrane, an oxygen electrode bonded to one of sides of said solid polymer electrolyte membrane, and a hydrogen electrode bonded to the other side of said solid polymer electrolyte membrane; an end plate interposed between the pair of bonded membrane-electrode assemblies; opposite outer end plates between which at least the pair of bonded membrane-electrode assemblies are positioned; a hydrogen flow passage formed through central portions of said bonded membrane-electrode assemblies to permit the flowing of a fluid therethrough; a single tie bolt passed through said hydrogen flow passage in the central portions of said bonded membrane-electrode assemblies to integrate said members; and a fixing nut threadedly fitted over said tie bolt to integrally tighten said bonded membrane-electrode assemblies between said end plates through O-rings or the like threadedly fitted over opposite ends of said tie bolt, wherein each of said bonded membrane-electrode assemblies includes a flow passage plate adjacent said oxygen electrode, and a separator plate serving as a collector plate and mounted adjacently outside the flow passage plate and outside the hydrogen electrode; one of said bonded membrane-electrode assemblies being immersed in water, and a DC power source being connected to the separator plate of said one bonded membrane-electrode assembly.

2. A fuel cell provided with a water electrolyzer according to claim 1, wherein one of the bonded membrane-electrode assemblies having the water-electrolyzing function comprises said oxygen electrode including a porous sheet-shaped carbon element plated with iridium, and a coated layer formed on a surface of said sheet-shaped carbon element, which is in contact with said solid polymer electrolyte membrane, by applying a mixture containing carbon and a resin for the solid polymer electrolyte membrane, and said hydrogen electrode including a porous sheet-shaped carbon element, a first coated layer formed on a surface of said sheet-shaped coated layer element, which is in contact with said solid polymer electrolyte membrane, by applying a mixture containing carbon and a resin for the solid polymer electrolyte membrane on that surface, and a second coated layer formed on said first coated layer adjacent said solid polymer electrolyte membrane by applying a mixture containing Pt (alloy) and/or Pt (alloy)-carried carbon and a resin for the solid polymer electrolyte membrane thereon; and the other of the bonded membrane-electrode assemblies having the power-generating function comprises each of said oxygen electrode and the hydrogen electrode including a porous sheet-shaped carbon element, a first coated layer formed on a surface of said sheet-shaped carbon element, which is in contact with said solid polymer electrolyte membrane, by applying a mixture containing carbon and a resin for the solid polymer electrolyte membrane on the surface thereof, and a second coated layer formed on said first coated layer adjacent said solid polymer electrolyte membrane by applying a mixture containing Pt (alloy) and/or Pt (alloy)-carried carbon and a resin for the solid polymer electrolyte membrane thereon.

3. A fuel cell provided with a water electrolyzer according to claim 1, wherein at least one of the bonded membrane-electrode assemblies comprises said oxygen electrode including a porous sheet-shaped carbon element plated with iridium, a first coated layer formed on a surface of said sheet-shaped coated layer element, which is in contact with said solid polymer electrolyte membrane, by applying a mixture containing carbon and a resin for the solid polymer electrolyte membrane on that surface, and a second coated layer formed on said first coated layer adjacent said solid polymer electrolyte membrane by applying a mixture containing Pt (alloy) and/or Pt (alloy)-carried carbon and a resin for the solid polymer electrolyte membrane thereon, and said hydrogen electrode including a porous sheet-shaped carbon element, a first coated layer formed on a surface of said sheet-shaped coated layer element, which is in contact with said solid polymer electrolyte membrane, by applying a mixture containing carbon and a resin for the solid polymer electrolyte membrane on the surface thereof, and a second coated layer formed on said first coated layer adjacent said solid polymer electrolyte membrane by applying a mixture containing Pt (alloy) and/or Pt (alloy)-carried carbon and a resin for the solid polymer electrolyte membrane thereon.

* * * * *